United States Patent Office 3,706,813
Patented Dec. 19, 1972

3,706,813
SELECTIVELY ADSORBING MULTIBRANCHED
PARAFFINS
Richard W. Neuzil, Downers Grove, Ill., assignor to Universal Oil Products Company, Des Plaines, Ill.
No Drawing. Filed July 8, 1971, Ser. No. 160,901
Int. Cl. C10g 25/04; C07c 9/16
U.S. Cl. 260—676 MS          7 Claims

ABSTRACT OF THE DISCLOSURE

A process for the separation of hydrocarbons utilizing a crystalline aluminosilicate adsorbent containing a specific cation ion-exchanged thereon and a specified range of water contents to provide a selective adsorption of a hydrocarbon type from a feed stream containing a mixture of hydrocarbons. Specifically, the separation involves selectively separating multibranched paraffins from a feed stream which contains a mixture of multibranched paraffins together with singly branched paraffins and/or normal paraffins. The separation can take place utilizing batch methods, moving bed systems, or simulated moving bed countercurrent flow schemes. Both liquid phase and vapor phase operations are anticipated. Specific feedstocks utilized in this process include high octane components—namely, the $C_5$ and $C_6$ hydrocarbons and specifically dimethylbutanes, methylpentanes and the normal hexanes and pentanes.

BACKGROUND OF THE INVENTION

Field of the invention

The general field of art to which this invention pertains is hydrocarbon separation. More specifically, this invention relates to a hydrocarbon separation process utilizing a crystalline aluminosilicate adsorbent to selectively separate various multibranched components from a paraffinic feed stock.

Description of the prior art

The separation art is abundant with patents relating to the use of the crystalline aluminosilicate zeolites for separating hydrocarbon mixtures. Specifically, various types of zeolites can be used to separate various hydrocarbon types such as aromatics, olefins or paraffinic substances from each other. Specific zeolites can be utilized which have been base exchanged to allow the various cations to be utilized advantageously in performing a predetermined selective adsorption of a hydrocarbon type.

Specifically, U.S. Pat. 2,935,539 (Cl. 260—676) having as its inventors, E. M. Gladrow and W. J. Mattox and U.S. Pat. 2,956,089 (Cl. 260—676) having as its inventors W. J. Mattox and C. N. Kimberlin relate to processes in which a particular crystalline aluminosilicate is utilized to selectively separate various branched hydrocarbon paraffins.

U.S. Pat. 2,935,539 claims and describes a process for the selective adsorption of doubly-branched hydrocarbons using a crystalline aluminosilicate having a basic nitrogen complex metallic aluminosilicate adsorbent. This patent relates to the use of complex amine based base-exchanged zeolites for the selective adsorption of doubly-branched hydrocarbons.

U.S. Pat. 2,956,089 relates to a process utilizing a crystalline aluminosilicate adsorbent which selectively adsorbs the singly-branched isomers from a mixture containing both singly and doubly-branched isomers.

SUMMARY OF THE INVENTION

The invention can be summarized as a process for selectively adsorbing multibranched hydrocarbons from a hydrocarbon feed mixture containing multibranched and at least singly-branched paraffin isomers utilizing a crystalline aluminosilicate adsorbent containing barium cations at the ion-exchangeable sites within the zeolite and containing water in a predetermined weight range.

In terms of chemical utility, this invention provides a process for the selective adsorption of multibranched paraffin isomers from a mixture of normal or singly-branched isomers, and can be used to supply relatively purified components to other processing units in the petrochemical industry.

DESCRIPTION OF THE PREFERRED EMBODIMENTS

Feed stocks which can be used in the process of this invention include mixtures of multibranched, singly-branched and normal paraffins having from about 4 to about 20 carbon atoms per molecule.

Specifically feed stock components can contain mixtures of 2,2-dimethylbutane, 2,3-dimethylbutane, 2-methylpentane, 3-methylpentane, normal hexane, normal pentane, iso-pentane, 2,2-dimethylpentane, 2,3-dimethylpentane, etc. Higher molecular weight feed stocks may be utilized and is not considered to be necessary to specifically name all the components possible in the above general group. The term "multibranched paraffins" when used as defining a component of the feed stock shall mean any paraffinic material having a methyl substitution of a carbon atom or atoms on the chain to render a non-normal or iso-compound. Specifically multibranched paraffins include those normal paraffins having more than one alkyl substitution on the normal paraffin chain or the iso-paraffins. Included within this definition are the dual, triple and even higher alkyl branched normal paraffins. The term "singly-branched paraffins" shall include those normal paraffins which contain only one alkyl substitution in order to make them a non-normal paraffin. Specifically, a single, methyl or higher alkyl group is substituted on the chain in order to form a non-normal configuration. The term "normal paraffins" is self-explanatory and includes those paraffins which are essentially defined in the art as straight-chained paraffins. The feed stock may contain small quantities of other hydrocarbon types such as olefinic materials, aromatic materials and cyclo-paraffins. Other contaminants such as organic nitrogen and sulfur compounds can be included within the general term of the feed stock. It is, however, preferred to reduce any of the contaminants in the feed stock to a minimum in order to eliminate adverse effects on the separation caused by such contamination of the adsorbent and to reduce any possibility of side reactions such as polymerization from occurring.

In some instances where the feed stock contains components covering a 3 to 6 or higher carbon number spread some of the high molecular weight singly-branched paraffins may equally compete for adsorptive sites within the adsorbent with lower molecular weight multibranched paraffins. To prevent interference of this type it is preferable to reduce the boiling range of the feed stock to less than a 3 carbon number spread.

Desorbent materials which can be used in the process of this invention include hydrocarbons similar to feed stock components—namely, multibranched paraffins, singularly branched paraffins or normal paraffins. Additionally, cyclo-paraffins, or sulfur or halide substituted paraffins may be utilized as desorbent materials. In other instances where desorption is effected by a purging, stripping gases such as nitrogen or oxygen may be utilized to purge selectively adsorbed feed components from the adsorbent. It is preferred, however, that desorbent materials which are used have a substantially different boiling point than that of the feed components in order to allow the materials removed from the adsorbent during the desorption step to be easily separated from the desorbent materials after recovery.

Specific hydrocarbon desorbents which can be used are those materials having at least one carbon number less or greater than feed components utilized and preferably having boiling ranges substantially different from the feed stock boiling range in order to induce an easy separation of the desorbent from the recovered feed components.

Adsorption conditions include temperatures within the range of about ambient up to 300° C. and preferably from within the range of from about 100° C. to about 200° C. Pressures which can be used during adsorption operations can vary anywhere from about slightly below atmospheric up to 1000 p.s.i.g. or higher depending upon the temperature requirements set for the adsorption operations and the feed stock components utilized. It is logically preferable to use relatively low pressures in order to reduce the cost of equipment when using the process in a commercial application. Consequently, pressures within the range of from about atmospheric to about 150 p.s.i.g. are preferred The adsorption conditions can be iso-thermal or they can vary in temperature depending upon the particular processing scheme utilized to effect separation. Adsorption conditions can include a step-wise procedure in which feed stock contacts a specific adsorbent at the aforesaid operating conditions for a period of time sufficient to effect the selective adsorption of the multibranched feed stock components within the adsorbent. The adsorbent can then be stripped of material surrounding the adsorbent by withdrawing it or by purging using a gas or another hydrocarbon material. Thereafter desorption conditions can take place by having a desorbent material contact the adsorbent and purge the selectively adsorbed multibranched components from the adsorbent.

Desorption conditions include the pressure and temperature limitations as desorbed for the adsorption conditions. Desorption conditions can vary temperature and pressure and sometimes can include vacuum desorption in which adsorbent is subjected to a vacuum in order to purge adsorbent components from it. Gaseous purge conditions can also be included within the scope of desorption conditions. It is contemplated that an increased temperature and decreased pressure operations can be effected during certain desorption conditions.

The term "selective pore volume" of the adsorbent is defined as the volume of the adsorbent which selectively adsorbs extract components from the feed stock. The term "non-selective void volume" of the adsorbent is the volume of the adsorbent which does not selectively retain extract components from the feed stock. This volume includes the inner cavities of the adsorbent which contain no selective adsorptive sites and interstitial void spaces between the adsorbent particles. The selective pore volume and the non-selective void volume are generally expressed in absolute volumetric quantities and are of importance in determining the proper flow rates of fluid required to be passed into an adsorption or desorption zone for efficient operation to take place for a given quantity of adsorbent utilized in the process.

In the process of this invention the term "extract components" from the feed stock shall include the multibranched component paraffins from the feed stock. Typically the extract components are those materials in the feed stock which are selectively adsorbed with respect to all the other feed stock components by the adsorbent. In order to take full advantage of the adsorbent, it is preferred that the entire selective pore volume of the adsorbent be filled with extract components before desorption conditions occur so that the available selective pore volume of the adsorbent is utilized. The term "raffinate components" refers to feed stock components which are not selectively adsorbed by the adsorbent.

The process flow of this invention can be either of the batch flow processing sequence or of a continuous processing sequence. Typically in the batch flow type processing sequence a feed stock contacts an adsorbent in a contacting chamber for a pre-determined period of time at a given set of operating conditions. Feed stock is allowed to pass through the adsorbent to the extent necessary to efficiently adsorb extract components from the feed stock. The feed stock is then stopped and any of the material remaining in the non-selective void volume can be drained or purged away from the adsorbent. This is done in order to retain high extract purities because the material residing in the non-selective void volume within the adsorbent particles typically contains feed stock components which are not selectively adsorbed by the adsorbent (raffinate materials). Desorption can take place as mentioned above at conditions which allow extract material to be removed from the adsorbent and recovered as a relatively pure product component. Many apparatus variations can take place in the batch type operating sequence and these can include a series of contacting chambers operating in a sequence in order to allow a continuous production of a product material.

Other processing flows include the continuous operations which are typically referred to in the art as either continuous moving bed processes or the fixed-bed simulated moving bed processes. Both of the continuous processes are well-described in the literature and is not felt that a detailed explanation of them is necessary. Typically, the fixed-bed simulated moving bed process include a column of adsorbent which is maintained at a given temperature and pressure. Feed stock material, desorbent material, extract material and raffinate material streams are all connected to the adsorbent column at various locations and shifted in a sequential manner through the column to effectively simulate a moving bed scheme. The fluid material contacting the adsorbent in the column is continuously moving in a countercurrent fashion with respect to the solid material. This type process is beneficial in many respects, the most important of which is the reduction of attrition of adsorbents is readily achieved since there is no movement of adsorbent in the column. A general description of the countercurrent fixed bed operations can be found in U.S. Pat. 2,985,589 having as its inventor, D. B. Broughton. It should be mentioned that the process of this invention is not limited in processing sequences except to the extent that adsorption and desorption operations are effected and can be effectively utilized in both the continuous and batch type processes.

Adsorbents which can be used in the process of this invention are generally referred to as the crystalline aluminosilicate zeolites or molecular sieves and can comprise both the natural and synthetic aluminosilicates. A crystalline zeolitic aluminosilicate encompassed by the present invention for use as an adsorbent includes aluminosilicate cage structures in which alumina and silica tetrahedra are intimately connected with each other in an open three dimensional crystalline network. The tetrahedra are cross linked by the sharing of oxygen atoms with spaces between the tetrahedra occupied by water molecules prior to partial or total dehydration of this zeolite. The dehydration results in crystals interlaced with channels having molecular dimensions.

In a hydrated form the crystalline aluminosilicate is represented by the formula in Equation 1 below:

$$M_{2/n}O:Al_2O_3:wSiO_2:yH_2O \qquad (1)$$

where M is a cation which balances the electrovalence of the tetrahedra and is generally referred to as an exchangeable cationic site, $n$ represents the valence of the cation, $w$ represents the moles of $SiO_2$, and $y$ the moles of water. The cations may be any one of a number of cations which will hereinafter be described in more detail.

Crystalline aluminosilicates which find use as the adsorbent in the process of this invention possess relatively well-defined pore structures. The exact type aluminosilicate is generally referred to by the particular silica alumina ratio and the pore dimension of the cage structures. Faujasites are commonly represented as being closely related to the type X and type Y aluminosilicates and are defined by their varying silica to alumina ratios.

The zeolite type X can be represented in terms of mole oxides as represented in the following Equation 2:

$$0.9 \pm 0.2 M_{2/n}O : Al_2O_3 : 2.5 \pm 0.5 SiO_2 : yH_2O \qquad (2)$$

where M represents at least one cation having a valence of not more than 3, $n$ represents the valence of M, and $y$ is a value up to about 8 depending upon the identity of M and the degree of hydration of the crystalline. Zeolite type X is described in U.S. Pat. No. 2,882,244.

The type Y zeolite can be represented in terms of the mole ratio of oxides for the sodium form as represented in the following Equation 3:

$$0.9 \pm 0.2 Na_2O : Al_2O_3 : wSiO_2 : yH_2O \qquad (3)$$

where $w$ is a value greater than 3 up to about 8, and $y$ may be any value up to about 9. The type Y zeolite is described in U.S. Pat. 3,130,007.

Adsorbents contemplated herein include the sodium form of the type Y zeolite which may be ion exchanged by partial or complete replacement of the sodium cations with other individual cations or groups of cations. Similarly the type X zeolite also may be ion-exchange and is contemplated for use as an adsorbent process of this invention. The type X or type Y structured zeolites generally refer to the type X or Y zeolites containing selected cations or pairs of cations at the exchangeable cation sites within the adsorbents. Binder materials may be present in the adsorbent.

Cationic or base exchange methods are generally known to those familiar with the field of crystalline aluminosilicate production are generally performed by contacting zeolite with an aqueous solution of soluble salts of the cations desired to be exchanged in the sieves. A desired degree of cation exchange will take place before the sieves are removed from the aqueous solution and dried to a desired water content. It is contemplated that cation exchange operations of the cation exchange may take place using individual solutions of the desired cations to be placed on the molecular sieve or using an exchange solution containing mixtures to the cations desired to be placed on to the crystalline aluminosilicate zeolite.

The cations which may be placed upon the crystalline aluminosilicate adsorbent preferably include barium cations. Other cations may be present in relatively small amounts either present in the zeolite before base exchange has taken place or placed on the zeolite to enhance the preferred property of barium cations. Other cations include cations selected from the Group I-A, Group II-A and Group I-B metals. Specifically, a preferred zeolite includes a substantially barium exchange type X or type Y structured zeolite containing a small portion of sodium or a small portion of potassium, the latter cation having a slight improved selectivity when coupled with the barium cation.

As has been noticed from the prior art various other cations have been disclosed for selectively adsorbing singly branched paraffins from multibranched paraffins. I have found that by utilizing the above preferred cations along with a given quantity of water on the zeolite that the selectivity can be reversed and that multibranched paraffins can be selectively adsorbed from singly branched and normal paraffins.

The degree of cation or base exchange is determined by many factors which include the length of time the zeolite is allowed to contact an aqueous mixture containing the soluble cation desired to be placed on the zeolite, the temperature at which the base exchange takes place and the concentration of the particular cation or cations within the aqueous solution. The particular cation being exchanged off of the zeolite also is an important factor in determining the degree of base exchange of the zeolite.

The cations may be placed on the zeolite in any concentration of from about 10% to about 100% of the concentration of the original cations present in the zeolite being replaced. By knowing the empirical formula including the silica over alumina ratio of the zeolite used, its water content, the type of cations originally present on the zeolite and those afterwards base exchanged upon the zeolite, it is possible to calculate percentage of the cationic sites within the zeolite which have been successfully exchanged with the desired cation. Using this figure it is possible to calculate the percentage of ion exchange which has taken place. When more than one cation is placed upon the zeolite it is preferred that the barium cation be present to a greater extent than the second cation placed on the zeolite. Specifically, in instances where cation pairs comprise a Group II-A metal and a Group I-A metal the weight ratio of the two components on the zeolite can vary anywhere from about less than about 1 to about 80 depending upon the molecular weight of the Group II-A or Group I-A metal. When using dual exchange zeolites a particular useful zeolite is one which contains barium and potassium cations having a weight ratio (based on the free metal) of barium to potassium of from about 1 to about 40 and preferably in the range of from about 1 to about 30.

Throughout this specification and unless otherwise noted, the percentage analysis of the zeolite shall be on what is generally referred to in the art as the "relative volatile-free basis." The chemical composition of the zeolite on a relative volatile-free basis is determined after the zeolite has been contacted in a muffle furnace at temperatures of about 500° C. for a time sufficient to allow the zeolite to react a constant weight. After the zeolite has reached a constant weight, the volatile material having been driven off, it is placed in a desiccator and allowed to reach room temperature after which it is analyzed to determine its chemical composition. All of the chemical analysis referred to herein are determined on this basis. It is presumed that when measuring water on a zeolite, that a given weight percentage, as measured on a relative volatile-free basis, is the quantity remaining after the concentration of the other components of the original zeolite have been determined. In determining a relative volatile-free basis it is presumed that in any zeolite which contains a binder material that the water is dispersed between the binder and zeolite in proportion to their respective weight ratios. The chemical analysis generally include binder material as part of the chemical analysis. In instances in which the binder material is used (generally with the type X structured zeolite) it is presumed that approximately 20 wt. percent on a volatile free-basis of the total adsorbent material utilized is a binder material. The binders generally comprise a clay structured amorphous type material generally containing silica-alumina mixtures.

A certain percentage of water must be placed on the zeolite in order to induce the reversal in selectivity—that is, changing the zeolite from a singly-branched paraffin selective zeolite to a multibranched paraffin selective adsorbent. Preferably, the water content of the zeolite should be in the range of from about 1 to about 10 weight percent of the zeolite adsorbent as measured on a relative volatile-free basis. In stating this range of water percentages it is presumed that the water is dispersed between any binder which may be present along with the zeolite and in the zeolite itself so that a measurement of water on a relative volatile-free basis indicates an extremely close approximation of the actual water content within the zeolite. The water present within the zeolite may be partially contained at the cationic or base exchange sites within the zeolite or it may be included within the cavities of the adsorbent. At the present time the reason for the water effecting a reversal in selectivities is not known.

But, a given range of water is needed in order to effect the present adsorption process. The particularly preferred range of water contents are from about 3 to about 8 wt. percent of the zeolite adsorbent as measured on a relative volatile-free basis. An even more particularly preferred water content range varies from about 4 to about 8 weight percent of the zeolite adsorbent as measured on a relative volatile-free basis.

Specifically, preferred zeolites which can be used in the process include the type X or type Y structured zeolites containing barium cations at the exchangeable cationic site within the zeolite and having water present in the zeolite adsorbent in a quantity within the range of from about 3 to about 8 weight percent of the zeolite adsorbent as measured on a relative volatile-free basis.

EXAMPLE

In this example various adsorbents were tested using a standard testing technique. The various tests illustrated the effects of water on a zeolite containing barium cations for the selectivity of multibranched paraffins as compared to singly-branched paraffins and normal paraffins. The apparatus utilized to effect the testing procedures consisted of an adsorption coil approximately 6 feet long having 3/8-inch outside diameter. The coil contained a volume of about 70 cc. This coil was loaded with a selected adsorbent material having a particle size of about 20 to 40 mesh. The coil was contained within a constant temperature heating bath in order to maintain the adsorbent materials located within the adsorption coil at given predetermined temperature during the testing procedures. The coil was adapted to maintain sufficient pressure on the feed and desorption components in order to maintain essentially liquid phase operations within the testing coil.

The overall testing procedure consisted of alternately passing a desorbent stream and a feed stream through the adsorbent located within the adsorption coil at conditions so that the pulse flow was maintained. The effluent flowing out of the adsorption coil was analyzed using a gas chromatograph to determine the relationship of the concentration of the components in the effluent stream with respect to time and the amount of material pumped through the adsorption coil. Initially, desorbent material was passed into the coil at a rate of one liquid hourly space velocity. After sufficient steady state flow was maintained the desorbent stream was stopped and immediately thereafter a 2.5 minute duration pulse of the feed stock was passed through the adsorption coil at one liquid hourly space velocity. After the 2.5 minute sequence of the feed passing into the coil was over, desorbent material was immediately passed into the adsorption coil at a one liquid hourly space velocity and continued until all of the feed stock components were eluded from the adsorbent. The effluent stream passing out of the adsorption coil was continuously monitored by a gas chromatograph which was able to determine relative concentrations of the various isomers present in the effluent stream leasing the coil.

In order to evaluate the adsorbent's performance for a given operation the chromatographs obtained from the effluent material were analyzed in order to determine the relative distance between the peaks on the chromatograph of the various feed isomers, peak heights and the slope approaching the maximum peak for each of the components. By using techniques known to those versed in the chromatographic art, it was possible to determine the selectivity of the adsorbent with respect to the feed isomers when compared to each other. The selectivities obtained using this procedure were found to be close to those obtained when using static selectivity measuring techniques. From experience using this type of technique for other separations using similar adsorbents it has been found that this testing procedure gives both accurate and reproducible results for selectivities for various feed components.

When referring to selectivity in this example we shall mean the ratio of the ratio of two given components in the adsorbed and the unadsorbed phase of the adsorbent. Specifically, selectivity can be defined as shown in Equation 4 below.

$$\text{Selectivity} = B_{m/n} = \frac{\left(\frac{m}{n}\right)_a}{\left(\frac{m}{n}\right)_u} \quad (4)$$

In the above equation the ratios of $m/n$ subscripted by letter $a$ represent the volumetric ratios of two components adsorbed upon the adsorbent, while the term $m/n$ subscripted by letter $u$ represents the volumetric ratio of the same two components in the unadsorbed phase. The adsorbed phase is present in the selective pore volume of the adsorbent while the unadsorbed phase is present in the nonselective voil volume. By comparing these two ratios it is possible to determine the ability of an adsorbent to selectively adsorb a given feed component. As can be seen from the selectivity as defined above, when that number approaches unity there is essentially no selectivity of an adsorbent for either of the two feed components being compared. As the value of feed becomes larger than unity or becomes smaller than unity the adsorbent becomes selective for one of the two components being analyzed. For instance, in cases in which the selectivity is greater than unity the adsorbent would be selective towards the adsorption of component $m$ with respect to component $n$ and in cases in which the selectivity of an adsorbent is less than unity the adsorbent selectively adsorbs component $n$ over component $m$.

In this experiment two desorbents containing essentially 100% of either iso-butane or iso-pentane were used. The feed stock used in all the tests in this example was made up of equal concentrations of the following isomers: 2,2-dimethylbutane (22DMB), 2,3-dimethylbutane (23DMB), 3-methylpentane (3MP), normal hexane ($nC_6$), isopentane ($iC_5$), and normal pentane ($nC_5$). Using the above described feed stock it is possible to determine the selectivity of an adsorbent for the multibranched paraffins—namely, 2,2-dimethylbutane and 2,3-dimethylbutane as compared to the singly branched materials—namely, 3-methylpentane.

Two different adsorbents were utilized for the four tests in this example. The adsorbent used in test 1 which is labeled adsorbent type X consisted of type X structured crystalline aluminosilicate which contained approximately 20% binder material. This adsorbent was originally a sodium type X structured zeolite which was base exchanged with barium to contain approximately 24.3 barium oxide on a relative volatile-free basis. The second adsorbent utilized consisted essentially of a type X structured crystalline aluminosilicate which had been exchanged with both barium and potassium cations. This adsorbent is labeled XX and was used in tests 2, 3 and 4. Adsorbent XX contained approximately 25 wt. percent barium oxide, 2.5 wt. percent potassium oxide, and approximately 1 wt. percent sodium oxide all measured on a volatile-free basis. This adsorbent also contained approximately 20 wt. percent binder on a volatile-free basis of a binder material.

When measuring the water content of a zeolite on a relative volatile free basis, the sieve is dried using a muffle furnace at any desired temperature to drive a certain percentage of volatile materials. After a certain period of time the only material being driven off is water. The drying procedure is stopped short of the condition when the adsorbent contains no water. The adsorbent is removed from the furnace and place in a desiccator to obtain room temperature and then sampled. The material not sampled is then utilized in a testing apparatus to determine the selectivity of the particular adsorbent for extract as compared to other feed isomers. The sample of the adsorbent not utilized in the separation testing is thereafter weighed and then subjected to a 500° temperature drying step in a muffle furnace until it reaches a constant weight. The difference between the weight of the material when sampled and the weight of the material obtained after constant weight has been achieved at 500° C. drying temperature is presumed to be the water content of the zeolite. For example a 100 gram sample of a zeolite which has just been ion-exchanged is taken as a sample from a larger batch of zeolite which had just been dried to a given water content. The one hundred gram sample of material is then subjected to 500° drying temperatures for a period of time sufficient to allow that material to reach a constant weight. If the original 100 gram sample after the 500° drying step weighs approximately 94 grams, it is calculated that the percentage of water on a relative volatile-free basis of the original adsorbent is 6 wt. percent. In other words of the original material placed into the drying furnace at 500° C., 6 wt. percent of that material had been driven off the zeolite in order to reach a constant weight state. This 6 wt. percent material in this specification is presumed to be essentially all water. By using the above example to illustrate what is meant by a percentage of water on a sieve on a relative volatile free basis, the various percentage of water utilized in the adsorbent can be reproduced in the laboratory. The results of the testing procedure for tests 1, 2, 3 and 4 using varying water containing zeolites is shown in Table I below.

TABLE I

Comparison of Selectivities on Wet and Dry Zeolite Adsorbents

| Test No. | 1 | 2 | 3 | 4 |
|---|---|---|---|---|
| Adsorbent type | X | XX | XX | XX |
| Percent H₂O wt | Dry | 5.0 | Dry | 5.0 |
| Temperature, °C | 80 | 80 | 25 | 25 |
| Desorbent type | i-C₅ | i-C₅ | i-C₄ | i-C₄ |
| Selectivities: | | | | |
| n-C₆/2,2 DMB | 2.07 | 0.65 | 1.53 | 0.92 |
| n-C₆/2,3 DMB | 1.80 | 0.78 | 1.45 | 0.96 |
| n-C₅/2,2 DMB | | | 1.32 | 0.82 |
| n-C₅/2,3 DMB | | | 1.25 | 0.87 |
| 3MP/2,2 DMB | 1.30 | 0.66 | 1.30 | 0.82 |
| 3MP/2,3 DMB | 1.13 | 0.80 | 1.26 | 0.87 |
| n-C₅/i-C₅ | | | 0.85 | 1.00 |
| n-C₆/i-C₅ | | | 0.97 | 1.11 |

Test 1 indicates that at 80° C. testing temperature with an iso-pentane desorbent that a dry adsorbent selectively adsorbed singly branched paraffins from the doubly branched paraffins as can be seen by the selectivity data for 3-methylpentane as compared to each of 2,2-dimethylbutane and 2,3-dimethylbutane. Test 2 indicated that adding water to a different adsorbent in approximately 5 wt. percent quantities completely reversed the selectivity for the same two components. Tests 3 and 4 are an even better comparison of the effects of utilizing water on the adsorbent to cause selective adsorption of multibranched paraffins from singly-branched paraffins. The adsorbent utilized in both tests 3 and 4 was identical except for the water content. The desorbents used in tests 3 and 4 were identical as were the testing temperatures namely 25° C. In every case going from test 3 to test 4 the selectivity (singly branched as compared to multibranched) was reversed by adding water to the adsorbent. As can be seen when comparing the selectivity of the adsorbent for the normal hexane as compared to the dimethylbutanes, adding water to the adsorbent completely reversed the selectivity from the dry sieve which was selective towards the normal hexanes to an adsorbent which was selective towards the multibranched dimethylbutanes. The same results were obtained when comparing the selectivity for normal pentane as compared to dimethylbutanes. In comparing the selectivity in tests 3 and 4 for the methylpentanes as compared to the dimethylbutane in a similar fashion the dry sieve selectivity was completely reversed from a sieve which was selective towards the singly branched component to a sieve which was selective towards a multibranched component. In comparing the selectivities of normal pentane and iso-pentane a dry sieve was shown to have a preference for adsorption of adsorbing the normal C₅. When water was added as seen in test 4 the selectivity was increased up to 1 which indicated there was no preference with the wet sieve for either of the two isomers, but that the normal C₅ isomer was at least not selectively adsorbed. A slightly better result was noticed when normal hexane was compared to isopentane going from test 3 to 4. The normal hexane in the dry sieve was selectively adsorbed as compared to the normal iso-pentane but in test 4 after 5% water had been added to the zeolite this selectivity was reversed.

I claim as my invention:

1. A process for separating multibranched paraffins from a feed mixture containing the same and at least one paraffin selected from the group consisting of singly-branched and normal paraffins, which process comprises contacting said mixture at adsorption conditions with a crystalline aluminosilicate adsorbent selected from the group consisting of type X and type Y structured zeolites containing barium cations at exchangeable cationic sites within the adsorbent crystalline structure and having water present in the zeolite adsorbent in a quantity within the range of from about 5 to about 8 weight percent of the zeolite adsorbent as measured on a relative volatile-free basis, thereby effecting the selective adsorption of said multibranched paraffins by said adsorbent.

2. The process of claim 1 further restricted in that said feed mixture contains paraffins having from 4 to about 20 carbon atoms per molecule.

3. The process of claim 2 further restricted in that said feed mixture contains at least two components selected from the group consisting of normal pentane, normal hexane, iso-pentane, 2-methylpentane, 3-methylpentane, 2,2-dimethylbutane and 2,3-dimethylbutane.

4. The process of claim 1 further restricted in that said zeolite adsorbent contains water within the range of from about 5 to about 7 weight percent of the zeolite adsorbent as measured on a relative volatile-free basis.

5. The process of claim 4 further restricted in that said zeolite adsorbent contains water within the zeolite within the range of from about 6.5 to about 7 weight percent of the zeolite adsorbent as measured on a volatile-free basis.

6. The process of claim 4 further restricted in that said zeolite is a type X zeolite.

7. The process of claim 4 further restricted in that said zeolite is a type Y zeolite.

References Cited

UNITED STATES PATENTS 2,935,539   5/1960   Gladrow et al. ___ 260—676 MS
2,956,089  10/1960   Mattox et al. ____ 260—676 MS HERBERT LEVINE, Primary Examiner U.S. Cl. X.R.

208—310